United States Patent
Nam et al.

(10) Patent No.: US 7,511,632 B2
(45) Date of Patent: Mar. 31, 2009

(54) REMOTE CONTROL DEVICE AND METHOD USING STRUCTURED DATA FORMAT

(75) Inventors: Kyung-chul Nam, Seoul (KR); Eun-Kyung Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 408 days.

(21) Appl. No.: 10/886,118

(22) Filed: Jul. 8, 2004

(65) Prior Publication Data

US 2005/0017890 A1    Jan. 27, 2005

(30) Foreign Application Priority Data

Jul. 24, 2003    (KR) ...................... 10-2003-0051036

(51) Int. Cl.
*G08C 19/00*    (2006.01)
(52) U.S. Cl. ........................... 340/825.72; 340/825.69; 340/5.61; 340/5.64; 340/825.37; 345/169; 345/158; 341/176
(58) Field of Classification Search ............ 340/825.72, 340/825.69, 5.61, 825.76, 2.21, 5.64, 825.37; 345/158, 162, 169, 173; 348/734; 725/52, 725/140, 141, 600; 341/176
See application file for complete search history.

(56) References Cited

U.S. PATENT DOCUMENTS

| | | | |
|---|---|---|---|
| 5,648,813 A | | 7/1997 | Tanigawa et al. |
| 6,005,490 A | * | 12/1999 | Higashihara ........... 340/825.72 |
| 6,034,689 A | | 3/2000 | White et al. |
| 6,097,441 A | | 8/2000 | Allport |
| 6,806,887 B2 | * | 10/2004 | Chernock et al. ........... 345/629 |
| 2002/0080161 A1 | | 6/2002 | St. Maurice et al. |
| 2002/0080163 A1 | | 6/2002 | Morey |
| 2003/0034957 A1 | | 2/2003 | Dubil et al. |
| 2003/0035074 A1 | | 2/2003 | Dubil et al. |
| 2003/0035075 A1 | | 2/2003 | Butler et al. |

FOREIGN PATENT DOCUMENTS

| | | |
|---|---|---|
| EP | 1 030 517 A1 | 8/2000 |
| JP | 11-18060 A | 1/1999 |
| JP | 11-32314 A | 2/1999 |
| JP | 7-334793 A | 12/1999 |
| JP | 2001-45322 A | 2/2001 |
| JP | 2002-281410 A | 9/2002 |
| JP | 2002-530018 A | 9/2002 |
| JP | 2003-174597 A | 6/2003 |
| KR | 97-008963 B1 | 6/1997 |
| KR | 2001-0067976 A | 7/2001 |
| WO | WO 02/31978 A2 | 4/2002 |
| WO | WO 03/085965 A1 | 10/2003 |

* cited by examiner

*Primary Examiner*—Brian A Zimmerman
*Assistant Examiner*—Vernal U Brown
(74) *Attorney, Agent, or Firm*—Sughrue Mion, PLLC

(57) ABSTRACT

A remote control device and method using a structured data format. The remote control device includes a data transmitting/receiving unit for receiving structured data from a remote transmitting/receiving device and extracting display information from the structured data; and a display unit for displaying the extracted display information. The data transmitting/receiving unit transmits metadata information corresponding to a piece of display information which a user selects from the display information to the remote transmitting/receiving device.

22 Claims, 5 Drawing Sheets

FIG. 3

```
<DRAMA1>
    <SELECT_MENU source_position_x = "100" source_position_y = "100">
        Actor/Actress introduction
    </SELECT_MENU>
    <SELECT_MENU source_position_x = "100" source_position_y = "200">
        Staff introduction
    </SELECT_MENU>
    <SELECT_MENU source_position_x = "100" source_position_y = "300">
        location introduction
    </SELECT_MENU>
    <SELECT_MENU source_position_x = "300" source_position_y = "250">
        Today's Episode
    </SELECT_MENU>
    <SELECT_MENU source_position_x = "300" source_position_y = "350">
        Previous Episode
    </SELECT_MENU>
    <SELECT_MENU source_position_x = "300" source_position_y = "450">
        Return
    </SELECT_MENU>
</DRAMA1>
```

FIG. 4

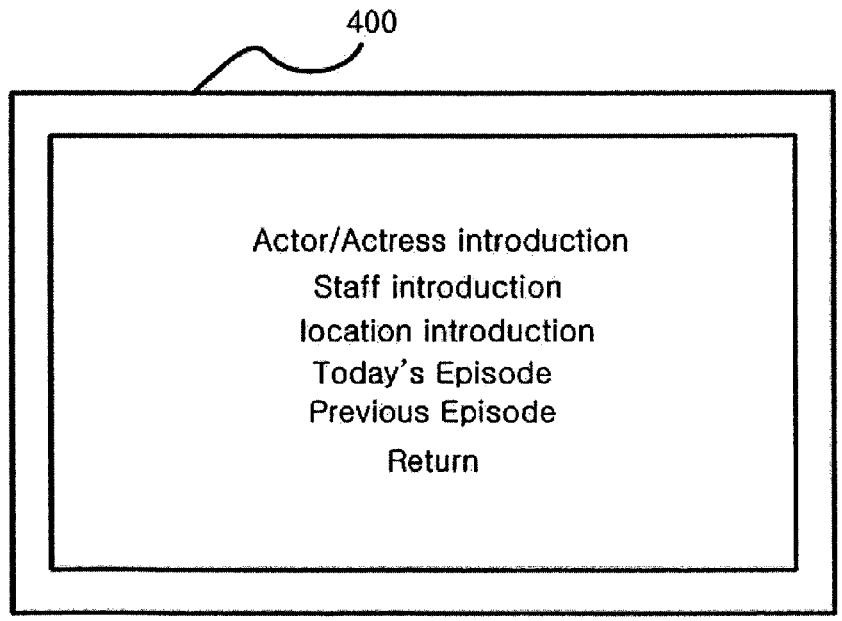

REMOTE CONTROL DEVICE AND METHOD USING STRUCTURED DATA FORMAT

BACKGROUND OF THE INVENTION

This application is based on and claims priority from Korean Patent Application No. 10-2003-0051036 filed on Jul. 24, 2003, in the Korean Intellectual Property Office, the disclosure of which is incorporated herein in its entirety by reference.

1. Field of Invention

The present invention relates to control of controlled devices that are controlled by means of wireless signals, and more particularly, to a remote control device and method for more conveniently obtaining a variety of additional information regarding digital contents by using a remote transmitting and receiving (transmitting/receiving) device capable of transmitting and receiving structured data.

2. Description of the Prior Art

In environments, such as in digital satellite broadcasts, cable broadcasts, digital terrestrial broadcasts, or digital versatile disks (DVDs), that provide audio or video signals and additional information, such as electronic program guides (EPGs) and applications, operations required for viewing detailed contents of such additional information have been generally performed using direction keys and other keys of remote control devices.

However, as additional information has increased both in amount and complexity with the development of digital broadcast techniques, it has become inconvenient to manage additional information-providing services using only such keys of remote control devices.

Thus, there is a need for enabling a user to more conveniently select a variety of additional information or applications and to receive services in response thereto.

SUMMARY OF THE INVENTION

In view of the aforementioned problem, a method is provided for enabling a user to easily select desired information among complicated application information by converting additional information into a structured data format in a remote transmitting/receiving device and by separating the structured data into display information and meta data on the display information and processing the separated information and data in a remote control device.

A remote control device using a structured data format according to an exemplary embodiment of the present invention comprises a data transmitting/receiving unit for receiving structured data from a remote transmitting/receiving device and extracting display information from the structured data; and a display unit for displaying the extracted display information, wherein the data transmitting/receiving unit transmits metadata information corresponding to a piece of display information which a user selects from the display information to the remote transmitting/receiving device. At this time, the remote transmitting/receiving device may comprise a data processing unit for receiving text information data and converting the text information data into a structured data format; and an application processing unit for transmitting the structured data to the remote control device and providing detailed information corresponding to the metadata information received from the remote control device.

Further, a remote control method using a structured data format according to an exemplary embodiment of the present invention comprises receiving at a remote transmitting/receiving device text information data, converting the data into a structured data format and transmitting the structured data to a remote control device; receiving the structured data transmitted from the remote transmitting/receiving device at the remote control device and extracting display information from the received data; displaying the extracted display information at the remote control device and transmitting metadata information corresponding a piece of display information which a user selects from the display information to the remote transmitting/receiving device; and providing detailed information corresponding to the transmitted metadata information at the remote transmitting/receiving device.

In exemplary embodiments, the metadata information is screen position information, and the remote control device is a bidirectional infrared wireless remote control device.

BRIEF DESCRIPTION OF THE DRAWINGS

The above and other objects and features of the present invention will become apparent from the following description of exemplary embodiments given in conjunction with the accompanying drawings, in which:

FIG. 3 is a view illustrating XML data into which the remote transmitting/receiving device converts text information data in accordance with an exemplary embodiment of the present invention;

FIG. 4 is a view illustrating a picture displayed on a screen of the remote control device according to an exemplary embodiment of the present invention;

DETAILED DESCRIPTION OF THE INVENTION

Hereinafter, a remote control device and method using a structured data format according to exemplary embodiments of the present invention will be described in detail with reference to the accompanying drawings.

Figure 1:
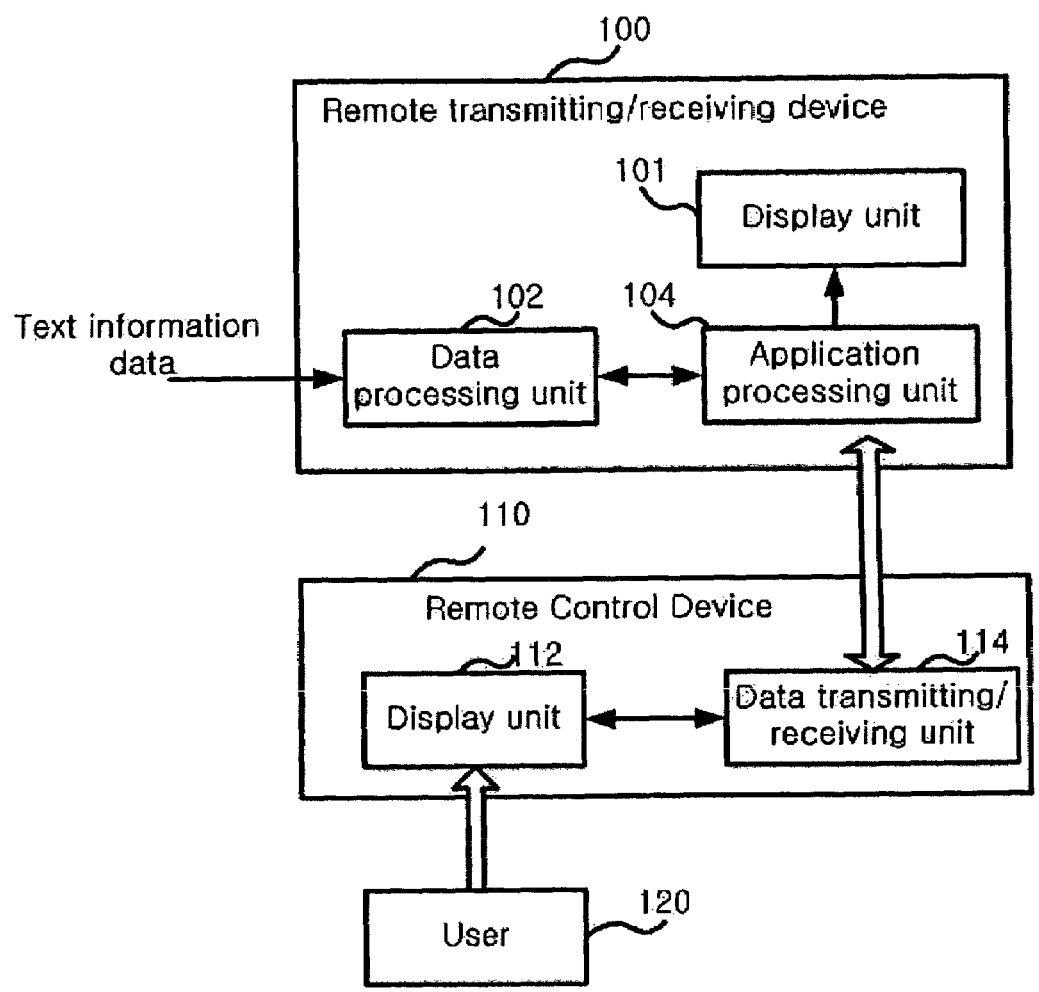
FIG. 1 is a view illustrating a remote transmitting/receiving device and a remote control device according to an exemplary embodiment of the present invention.

FIG. 1 is a view illustrating a remote transmitting/receiving device 100 and a remote control device 110 according to an exemplary embodiment of the present invention. The remote transmitting/receiving device 100 comprises a display unit 101; a data processing unit 102 for receiving text information data and converting the received text information data into a structured data format; and an application processing unit 104 for transmitting structured data to a remote control device 110, receiving metadata information from the remote control device 110 and providing detailed information corresponding to the metadata information. Further, the remote control device 110 comprises a data transmitting/receiving unit 114 for receiving the structured data from the remote transmitting/receiving device 100 and extracting display information from the received data; and a display unit 112 for displaying the display information extracted by the data transmitting/receiving unit 114 and forwarding the display information selected according to an input from a user 120 to the data transmitting/receiving unit 114. Here, the display information represents text information that is displayed on a screen (for example, screen 200 in FIG. 2) of the display unit 101 of the remote transmitting/receiving device 100.

Generally, the remote transmitting/receiving device 100 may be, or may be linked to, a digital television (DTV) or any display device which displays moving pictures on a screen, and provides audio and video signals, various applications or additional information in a text format and the like from digital satellite broadcasts, digital terrestrial broadcasts, digital cable broadcasts, or digital content storage media such as DVDs.

Figure 2:
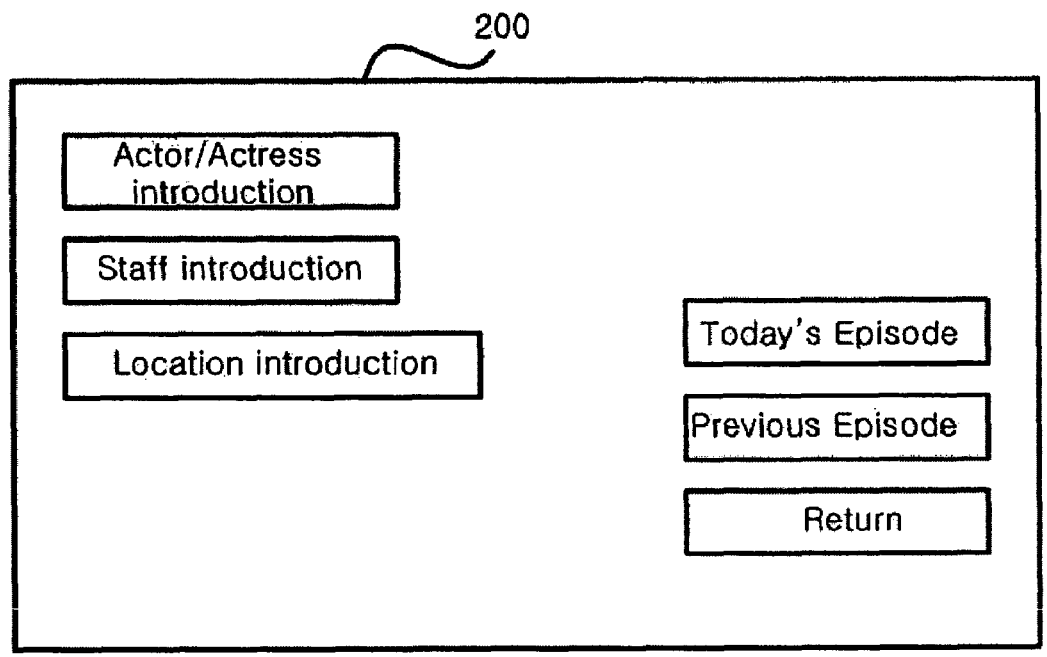
FIG. 2 is a view illustrating a picture displayed on a screen of the remote transmitting/receiving device according to an exemplary embodiment of the present invention.

FIG. 2 shows an example of additional information on a drama displayed on a screen 200 of the display unit 101 of the remote transmitting/receiving device 100. Here, the data processing unit 102 of the remote transmitting/receiving device 100 converts additional information in a text format into structured data. At this time, the structured data may be composed of display information and metadata on the display information. An example of the structured data includes data in an Extensible Markup Language (XML) format. For example, characters, title and a broadcast time of the drama may be considered display information when additional information on a drama is provided. At this time, information regarding positions where the additional information is displayed on the screen may be considered metadata on the respective display information.

FIG. 3 is a view illustrating the additional information shown in FIG. 2 in an XML format. Here, coordinates of X and Y have (0,0) at a upper left position on the screen 200 and a maximum value at a lower right position on the screen 200.

When the user 120 selects desired additional information from the provided additional information, the user 120 can view detailed information corresponding to the desired additional information. The application processing unit 104 transmits the structured data to the remote control device 110 which may be an infrared remote control device or a wireless control device conforming to a wireless related protocol such as bluetooth, a wireless LAN, net, or the like, which can perform bidirectional transmission and reception. Here, the data transmitting/receiving unit 114 of the remote control device 110 extracts display information from the received data, and the display unit 112 displays the extracted display information. FIG. 4 shows an example of the display information that has been extracted from the data shown in FIG. 3 and then displayed on a screen 400 of the display unit 112 of the remote control device 110.

When the display information has been displayed on the screen 400 of the display unit 112, the user 120 may select desired additional information by performing an input operation directly on the screen if the screen is a touch screen, or a selection operation by manipulating keys of the remote control device 110. When the user 120 has selected the desired additional information, the data transmitting/receiving unit 114 transmits metadata corresponding to the desired additional information, e.g., position information on the additional information, to the remote transmitting/receiving device 100.

When the remote transmitting/receiving device 100 receives the metadata, the display unit 101 displays detailed information corresponding to the metadata information. That is, assuming that the metadata information is position information regarding the additional information, the display unit 101 of the remote transmitting/receiving device 100 displays the detailed contents of the additional information corresponding to the relevant position information.

Figure 5:
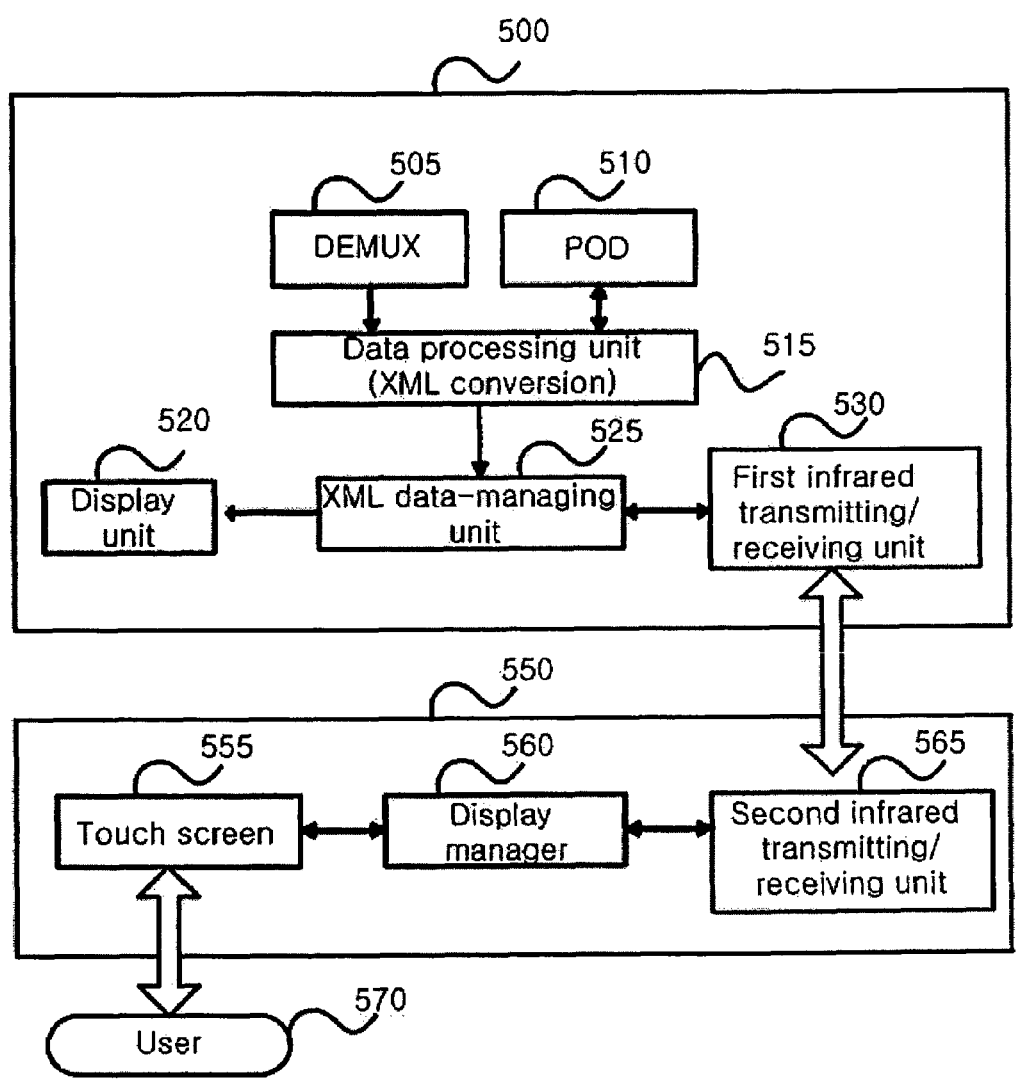
FIG. 5 is a view illustrating a remote transmitting/receiving device and a remote control device using XML according to an exemplary embodiment of the present invention.

FIG. 5 is a view illustrating a remote transmitting/receiving device 500 and a remote control device 550 using XML according to another exemplary embodiment of the present invention. In FIG. 5, digital cable broadcast adopting an OpenCable standard protocol is shown by way of example. The remote transmitting/receiving device 500 comprises a point of deployment (POD) 510 for receiving out-of-band data; a demultiplexer (DEMUX) 505 for separating data including sections from an in-band signal selected by a user 570; a data processing unit 515 for converting the data separated through the POD 510 and the DEMUX 505 into data in an XML format and storing the converted XML data; an XML data-managing unit 525 for managing the converted XML data, applications, and bidirectional position information; a display unit 520 for providing additional information to the user; and a first infrared transmitting/receiving unit 530 for transmitting and receiving XML data. The remote control device 550, e.g., a bidirectional infrared remote control device, comprises a second infrared transmitting/receiving unit 565 for transmitting and receiving data in an XML format having display information and position information to and from the remote transmitting/receiving device 500; a display manager 560 for parsing the data in the XML format, providing display information corresponding to the relevant position information, and providing metadata position information corresponding to a user's selection to the second infrared transmitting/receiving unit 565; and a touch screen 555 for displaying the display information, which has been provided by the display manager 560, to the user 570 and receiving input from the user 570.

The remote transmitting/receiving device 500 receives data introduced via the DEMUX 505 for separating section data and application data in an in-band channel selected by the user, and out-of-band data introduced via the POD 510 regardless of a user's selection in case of an OpenCable host.

Then, the XML data processing unit 515 converts the data received from the DEMUX 505 or the POD 510 to data in the XML format, and the XML data-managing unit 525 constructs a separate database (not shown) to manage the data converted by the XML data processing unit 515.

When the user 570 selects a service such as an electronic program guide (EPG) or an application by using the remote control device 550, a control signal requesting the service is transferred to the first infrared transmitting/receiving unit 530 via the second infrared transmitting/receiving unit 565. The XML data-managing unit 525 causes the display unit 520 to display the service selected by the user 570, and then transfers the data in the XML format to the second infrared transmitting/receiving unit 565 via the first infrared transmitting/receiving unit 530.

The display manager 560 parses the XML data received from the second infrared transmitting/receiving unit 565, separates the parsed data into position information and display information and displays them on the touch screen 555. That is, the same information is displayed on both the display unit 520 of the remote transmitting/receiving device 500 and the touch screen 555 of the remote control device 550, thus allowing the user 570 to manipulate the service by using the touch screen 555 of the remote control device 550.

When the user 570 selects specific display information on the touch screen 555, the display manager 560 extracts position information on the selected information and transfers it to the second infrared transmitting/receiving unit 565. The second infrared transmitting/receiving unit 565 transmits the position information to the first infrared transmitting/receiving unit 530. The position information is in turn transferred to the XML data-managing unit 525. The XML data-managing unit 525 provides the user with detailed information corresponding to the transferred position information through the display unit 520.

Figure 6:
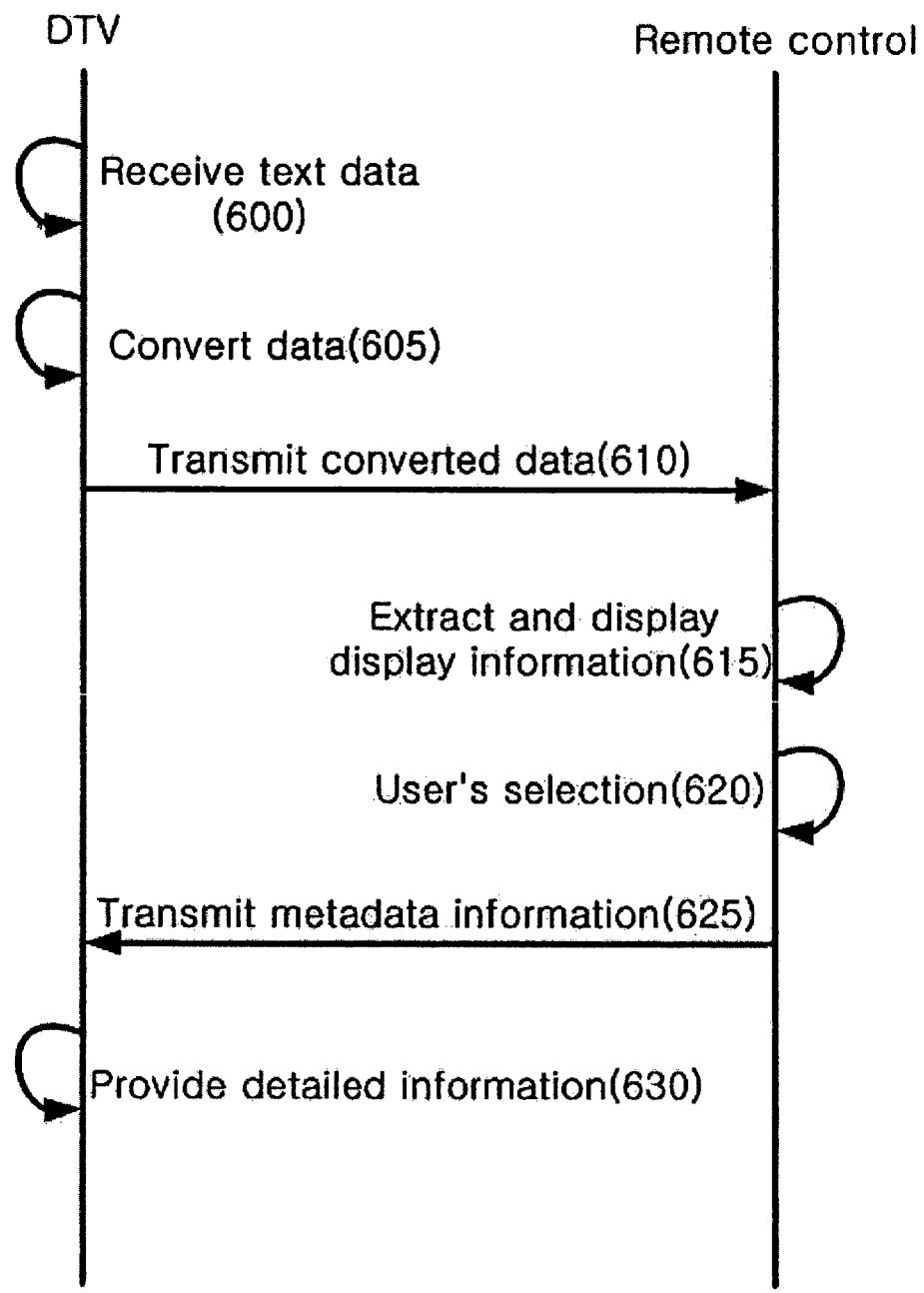
FIG. 6 is a view illustrating a remote control method according to an exemplary embodiment of the present invention.

FIG. 6 is a view illustrating a remote control method according to an exemplary embodiment of the present invention. The method will be described by way of example in connection with a case where the remote transmitting/receiving device is a DTV and the remote control device is a remote control.

The DTV receives text information data (600), converts the text information data into a structured data format (605), and transmits the structured data to the remote control (610). When the remote control has received the data transmitted from the DTV, the remote control extracts display information from the received data, and displays the extracted display information on a screen of the remote control (615). When the user selects desired additional information (620), the remote control transmits metadata information, which corresponds to the display information selected by the user, to the DTV (625), and the DTV provides the user with detailed information corresponding to the transmitted metadata information (630).

According to the present invention described as above, it is possible to improve the efficiency of a system by converting information related to a data service into structured data such as XML and managing the structured data. Further, it is possible to improve convenience in use by enabling the user to easily select additional information on digital content through a screen of a remote control device for a display device such as a DTV.

The present invention described above is not limited to the exemplary embodiments illustrated in the accompanying drawings, since those skilled in the art can make various substitutions, changes and modifications without departing from the technical spirit and scope of the present invention.

What is claimed is:

1. A remote control method, comprising:
   receiving structured data that includes display information and metadata information corresponding thereto from a remote transmitting/receiving device;
   extracting one or more display information from the received structured data and displaying the extracted display information; and
   transmitting the metadata information which corresponds to the display information selected from the one or more extracted display information to the remote transmitting/receiving device;
   wherein, the structured data is generated by using text information data received by the remote transmitting/receiving unit.

2. The method of claim 1, wherein the metadata information is screen-position information in which the display information is displayed on the remote transmitting/receiving device.

3. The method of claim 1, wherein the display information is the additional information of the broadcasting data.

4. The method of claim 1, wherein the display information is text information.

5. A remote control method, comprising:
   receiving text information data;
   generating structured data that includes display information and metadata information corresponding thereto by using the received text information data;
   transmitting the generated structured data to a remote control device;
   receiving the metadata information that corresponds to the display information selected from one or more display information transmitted from the remote control device; and
   displaying additional information that corresponds to the received metadata information.

6. The method of claim 5, wherein the metadata information is screen position information that displays the display information.

7. The method of claim 5, wherein the displaying information is the additional information of the broadcasting data.

8. The method of claim 5, wherein the display information is text information.

9. The method of claim 5, wherein the remote control device is a bi-directional wireless remote control.

10. The method of claim 1, wherein the structured data is in accordance with Extensible Markup Language (XML) format.

11. The method of claim 5, wherein the structured data is in accordance with Extensible Markup Language (XML) format.

12. A remote control device, comprising:
    a data transmitting/receiving unit for receiving structured data that includes display information and metadata information corresponding thereto from a remote transmitting/receiving device, and extracting one or more display information from the received structured data; and
    a display unit for displaying the extracted display information,
    wherein, the data transmitting/receiving unit transmits the metadata information which corresponds to the display information selected from the one or more extracted display information to the remote transmitting/receiving device,
    wherein, the structured data is generated by using text information data received by the remote transmitting/receiving device.

13. The remote control device of claim 12, wherein the metadata information is screen-position information in which the display information is displayed on the remote transmitting/receiving device.

14. The remote control device of claim 12, wherein the display information is the additional information of the broadcasting data.

15. The remote control device of claim 12, wherein the display information is text information.

16. The method of claim 12, wherein the structured data is in accordance with Extensible Markup Language (XML) format.

17. A remote transmitting/receiving device, comprising:
    data processing unit for receiving text information data, and generating structured data that includes display information and metadata information corresponding thereto by using the received text information data; and
    application processing unit for transmitting the generated structured data to a remote control device, and receiving the metadata information that corresponds to the display information selected from one or more display information transmitted from the remote control device, and displaying additional information that corresponds to the received metadata information.

18. The remote transmitting/receiving device of claim 17, wherein the metadata information is screen-position information that displays the display information.

19. The remote transmitting/receiving device of claim 17, wherein the display information is the additional information of the broadcasting data.

20. The remote transmitting/receiving device of claim 17, wherein the display information is text information.

21. The remote transmitting/receiving device of claim 17, wherein the remote control device is a bi-directional wireless remote control.

22. The remote transmitting/receiving device of claim 17, wherein the structured data is in accordance with Extensible Markup Language (XML) format.

* * * * *